United States Patent [19]

Kurosawa et al.

[11] Patent Number: 5,038,031
[45] Date of Patent: Aug. 6, 1991

[54] OPTICAL ROTARY ENCODER HAVING LARGE AND SMALL NUMERICAL APERTURE FIBERS

[75] Inventors: Yoshi Kurosawa; Seiichi Sato; Kazuo Yamaguchi, all of Tokyo; Atsushi Ueda; Masami Matsumura, both of Hyogo; Fumitaka Imamura; Satoru Hagihara, both of Tokyo, all of Japan

[73] Assignees: Optec D.D. Melco Laboratory Co., Ltd.; Optec Dai-Ichi Denko Co., Ltd.; Mitsubishi Denki Kabushiki Kaisha, all of Tokyo, Japan

[21] Appl. No.: 540,006

[22] Filed: Jun. 19, 1990

[30] Foreign Application Priority Data

Jun. 22, 1989 [JP] Japan .............................. 1-72381[U]
Jun. 22, 1989 [JP] Japan .............................. 1-72382[U]
Jun. 22, 1989 [JP] Japan .............................. 1-72383[U]
Jun. 22, 1989 [JP] Japan .............................. 1-72384[U]

[51] Int. Cl.$^5$ ............................................. G01D 5/34
[52] U.S. Cl. .......................... 250/231.14; 250/227.28
[58] Field of Search ....................... 250/227.28, 227.21, 250/231.14, 231.16, 237 G; 356/375; 33/707; 350/96.15, 96.16

[56] References Cited

U.S. PATENT DOCUMENTS

| 4,096,383 | 6/1978 | Mancini et al. | 250/231.14 |
| 4,536,649 | 8/1985 | Kozai et al. | 250/231.14 |
| 4,981,338 | 1/1991 | Bobb et al. | 356/128 |

Primary Examiner—David C. Nelms
Assistant Examiner—Que T. Le
Attorney, Agent, or Firm—Cushman, Darby & Cushman

[57] ABSTRACT

An optical encoder comprising a photointerruptor having light-emitting and light-receiving optical fibers and a rotatable pulse scale disposed in an optical path between both of the opposed end faces of the optical fibers so as to shut the optical path intermittently, thereby generating optical pulses in accordance with an angle of rotation of the pulse scale, in which the light-receiving optical fiber has a larger diameter and a greater numerical aperture NA than those of the light-emitting fiber. The light-emitting optical fiber may be replaced with a light-emitting device. Further, a reflector may be interposed in the optical path. Optical pulse signals indicative of an angle of rotation can be detected effectively and it is possible to facilitate the assembling or wiring operation and reduce the production cost.

4 Claims, 4 Drawing Sheets

OPTICAL ROTARY ENCODER HAVING LARGE AND SMALL NUMERICAL APERTURE FIBERS

BACKGROUND OF THE INVENTION

1. Field of the Invention

The present invention concerns an optical rotary encoder adapted to intermittently shut an optical path of a photointerruptor by the rotation of a rotatable pulse scale and generate and detect optical pulse signals in accordance with an angle of rotation of the pulse scale and, more in particular, it relates to an optical rotary encoder which can be suitably used in severe working circumstances giving undesired effects of electromagnetic noises or vibrations or in a restricted space, for example, a rotary encoder used as a crank angle sensor in a car engine.

2. Description of the Prior Art

Known rotary encoders include those comprising a optical device type photointerruptor using a pair of a light-emitting device and a light-receiving device and an optical fiber type photointerruptor using a pair of a light-emitting optical fiber and a light-receiving optical fiber, as means for detecting optical pulse signals.

The optical rotary encoder of the optical device type photointerrupter comprises a light-emitting device and a light-receiving device disposed on both sides of a coded pattern formed on a pulse scale.

Light from the light-emitting device is irradiated to the pulse scale and optical pulse signals are generated when the optical path of the light is shut intermittenty by the coded pattern upon rotation of the pulse scale, and converted by the light-receiving device into electric signals.

However, when such an optical rotary encoder is used, as for example, a car engine, erroneous operation is caused by electromagnetic noises, etc., making it impossible for accurate pulse detection.

The optical rotary encoder using the optical fiber type photointerruptor includes a transmission type in which ends of a light-emitting optical fiber and a light-receiving optical fiber are opposed to each other on both sides of the pulse scale, and a reflection type in which a light-emitting optical fiber and a light-receiving optical fiber are disposed on one identical side of a pulse scale on which a coded pattern is formed.

The optical fiber type photointerruptor is free from erroneous operation caused by the electromagnetic noises, etc. since detected signals are transmitted in the form of optical signals.

However, in order to minimize the loss of optical transmission, a micro-lens such as a rod lens has to be attached to the top end of each optical fiber. Then, accurate alignment is necessary for the optical axes between the optical fiber and the rod lens attached thereto. Such alignment is necessary between the light-emitting and light-receiving optical fibers as well.

Further, the number of additional parts such as rod lenses and the number of assembling steps are increased to require much production cost.

Further, in the transmission type optical rotary encoder, wiring operation for the light-receiving and light-emitting optical fibers disposed on both sides of the pulse scale is troublesome. In addition, since a quartz type optical fiber used for reducing the optical transmission loss can not be bent with an acute angle, it brings about a difficulty in installing the optical fibers in a restricted space.

Meanwhile, in the reflection type optical rotary encoder, the wiring operation for the light transmitting and receiving optical fibers is relatively easy, but it often causes misalignment for the reflected light upon irregular vibrations of a pulse scale making accurate measurement difficult or even impossible.

OBJECT OF THE INVENTION

It is, accordingly, a first object of the present invention to provide an optical rotary encoder capable of obtaining a sufficient intensity of light to the detection of optical pulse signals without using an additional microlens such as a rod lens, moderating the accuracy for the alignment of optical axes of the optical fibers, thereby facilitating the assembling operation, and capable of decreasing the number of steps and assembling cost by the reduction of the number of parts.

Another object of the present invention is to provide an optical rotary encoder capable of facilitating the wiring operation, and capable of conducting accurate measurement without failure even if the pulse scale is vibrated.

The foregoing objects of the present invention can be attained by an optical rotary encoder comprising:

a photointerruptor having a light transmitting means and a light-receiving means that constitute an optical path between both of the means, a rotatable pulse scale having an optical coded pattern consisting of a series of optical codes each disposed at an equi-pitch along the circumference thereof and intermittently shut the optical path to generate and detect optical pulse signals in accordance with an angle of rotation of the pulse scale, the light-emitting means and the light-receiving means of the photointerruptor comprising a light-emitting optical fiber and a light-receiving optical fiber respectively, in which the light-receiving optical fiber has a larger fiber diameter and a greater numerical aperture NA than those of the light-emitting optical fiber.

With the optical rotary encoder according to the present invention, since the light-emitting optical fiber used has a smaller diameter and a smaller numerical aperture NA as defined just later, diffusion of emitted light can be reduced. Accordingly, light from the light-emitting optical fiber can be irradiated to the pulse scale substantially at a reduced area like that in the case of using a micro-lens such as a rod lens.

The numerical aperture NA of an optical fiber means herein a maximum value of an angle made between a light emitted, into air, from an exposed cross section of the fiber which is cut vertically relative to the optical axis and the axis of the fiber, and it is generally represented by the equation:

$$NA \approx (n_1^2 - n_2^2)^{\frac{1}{2}}$$

where $n_1$ represents a refractive index of a core and $n_2$ represents a refractive index of a clad layer of the optical fiber.

In addition, since the light-receiving optical fiber used has a larger diameter and a greater numerical aperture NA than those of the light-emitting optical fiber, it can receive the transmission light at a large area and even a light with a certain diffusion can effectively be received as it is with no aid of a micro-lens such as a rod lens.

Accordingly, loss of optical transmission can be minimized and, if the optical axis of the light-emitting optical fiber is somewhat displaced or tilted relative to that of the light-receiving optical fiber upon assembling the photointerruptor, detection is still possible. Then, no accurate alignment for the optical axis is required to facilitate assembling work and improve the yiedl of products.

In particular, in a reflection type optical rotary encoder, reliable detection is possible even when the pulse scale is vibrated to fluctuate the optical path of the reflection light more or less.

Furthermore, in a case at least one of the light-emitting and light-receiving optical fibers is made of a plastic fiber and extended in the same direction as that for another optical fiber, wiring operation is facilitated due to the flexibility of the plastic fiber. Accordingly, when the rotary encoder is installed in a restricted space such as in a car engine room, there is no trouble as in the case of bending a rigid quartz fiber.

Further, in a case the light-emitting optical fiber is replaced with a light-emitting device, the total length of the optical optical fibers can be decreased to ½ to reduce the production cost. In this case, since the light-emitting device emits light which is not restricted into a fine beam as in the case of the optical fiber, but diffused to some extent, the light can be received with no requirement for the accurate alignment of the optical axis of the light-receiving optical fiber.

In addition, since light is directly entered from a light source, that is, from the light-emitting device to the light-receiving optical fiber directly, not by way of the optical fiber, optical pulse signals at a sufficient light intensity for the measurement can be outputted.

DESCRIPTION OF THE ACCOMPANYING DRAWINGS

These and other objects, as well as advantageous features of the present invention will become apparent by reading the following descriptions for preferred embodiments according to the present invention in conjunction with the appended drawings, wherein.

DESCRIPTION OF THE PREFERRED EMBODIMENTS OF THE INVENTION

The present invention will be described referring to preferred embodiments illustrated in the drawings.

Figure 11:
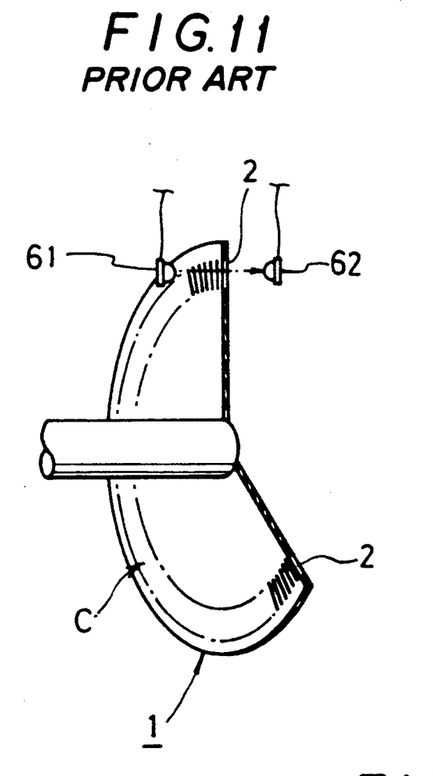
FIGS. 11 and 12 are perspective views illustrating conventional transmission type rotary encoders.
Figure 12:
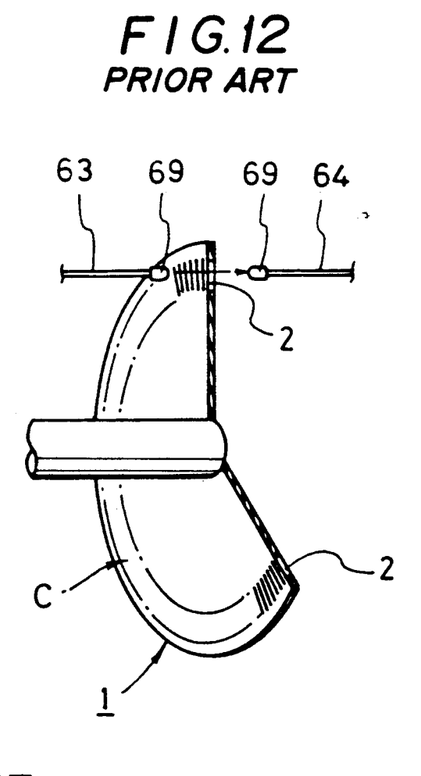
Figure 13:
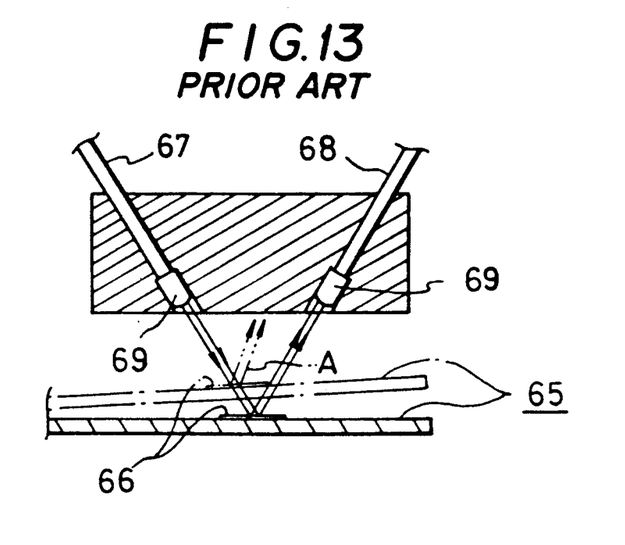
FIG. 13 is a cross sectional view illustrating a portion of a conventional reflection type rotary encoder.

Prior to the detailed explanations for the preferred embodiments according to the present invention, outline for the conventional type optical rotary encoders are shown briefly for explaining drawbacks in the prior art referring to FIGS. 11 through 13.

FIG. 11 shows an optical rotary encoder using a conventional optical device type photointerruptor. As shown in the figure, a light-emitting device 61 such as a light-emitting diode and a light-receiving device 62 such as a photodiode are opposed to each other on both sides of an optical coded pattern C formed on a disk-like rotary pulse scale 1.

Light from the light-emitting device 61 is restricted into a fine aperture by a collimate lens (not illustrated) and irradiated to the pulse scale 1. When the pulse scale 1 is rotated, the optical path of the light transmitted through a series of light transmitting holes 2, 2,—which are disposed at an equi-pitch along the circumference of the disk-like pulse scale and which constitute the coded pattern C, is shut intermittently and the optical pulse signals thus generated are converted by the light-receiving device 62 into electric signals and outputted.

However, if the optical rotary encoder of the optical device type is used as, for example, a crank angle sensor of a car engine, the rotary encoder is exposed to undesirable circumstances such as electromagnetic noises generated from spark plugs in an engine room and causes erroneous operation failing to conduct accurate angle detection.

FIG. 12 shows another example of a conventional rotary encoder using an optical fiber type photointerruptor in which a light-emitting optical fiber 63 and a light-receiving optical fiber 64 are opposed with their end faces being opposed to each other on both sides of a pulse scale 1. FIG. 13 shows a further conventional example, i.e., a reflection rotary encoder using an optical fiber type photointerruptor in which a series of light reflecting portions 66, 66—constituting an optical coded pattern C are formed each at an equi-pitch on the surface of a pulse scale 65 and a light-emitting optical fiber 67 for irradiating light to the light reflecting portion 66 and a light-receiving optical fiber 68 for receiving the light reflected from the light reflecting portion 66 are disposed on one identical side of a disk-like rotary pulse scale 65. Such an optical fiber type photointerruptor has a merit free from erroneous operation caused by the effect of the electromagnetic noises even if they are used as, for example, a crank angle sensor in a car engine.

However, for minimizing loss of optical transmission, a micro-lens such as a rod lens 69 has to be attached to each of the top ends of the light-emitting and light-receiving optical fibers to collimate the light in parallel or to condense the incident light.

Accordingly, upon assembling the photointerruptor, an accurate alignment is necessary between the optical axis for the optical fiber and that for the rod lens in the step of mounting the rod lens.

Further, in order to effectively enter the irradiation light restricted into a fine beam by the rod lens to the light-receiving optical fiber, accurate alignment is also necessary for the axes between the light-emitting optical fiber and the light-receiving optical fiber.

Furthermore, since a micro-lens such as a rod lens is necessary, the number of parts and the number of assembling steps are increased thereby making the production cost higher.

In addition, in the transmission type optical rotary encoder, since the light-receiving optical fiber and the light-emitting optical fiber are extended respectively from both sides of the pulse scale 1, their wiring operation is troublesome. Further, since an optical fiber made of quartz is used in order to minimize the loss of optical transmission between the light-emitting optical fiber 61 and the light-receiving optical fiber 62, such a rigid fiber can not be bent at a small radius of curvature, making it difficult to be installed in a restricted space such as in an engine room.

On the other hand, in the case of the reflection type optical rotary encoder, since the light-emitting optical fiber 63 and the light-receiving optical fiber 64 are extended on one identical side relative to the pulse scale 1, the wiring operation is relatively easy. However, if the movement of the pulse scale fluctuates by the vibrations of the engine, reflected light is greatly deviated from a correct optical path as shown in the dotted chain A in FIG. 13 and the light can no more enter the end face of the light-receiving optical fiber 68 to bring about a risk of making the measurement impossible.

In short, the transmission type optical rotary encoder involves a problem that wiring operation is troublesome, although it causes less worry of measurement failure even when the rotation of the pulse scale flutuates by the vibrations of the engine. On the other hand, the reflection type optical rotary encoder involves a problem of causing measurement failure if the movement of the pulse scale fluctuates by the vibrations of the engine, although the wiring operation is relatively ease.

Preferred embodiments of the optical rotary encoder according to the present invention for overcoming such drawbacks in the prior art will now be described in details referring to the drawings.

EXAMPLE 1

Figure 1:
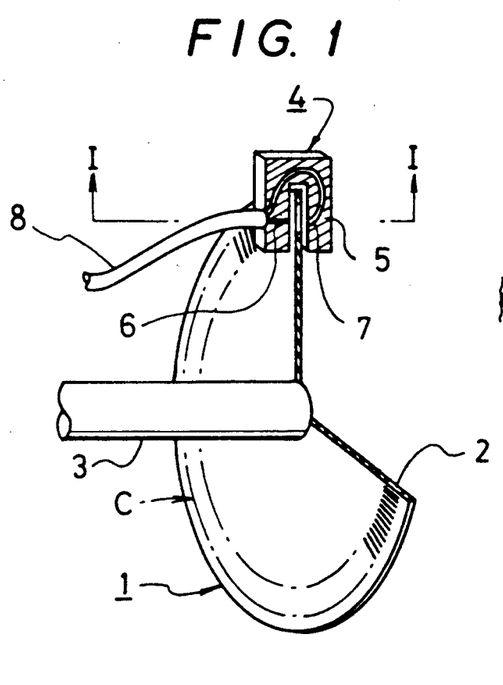
FIG. 1 is a perspective view illustrating one embodiment of an optical rotary encoder according to the present invention.
Figure 2:
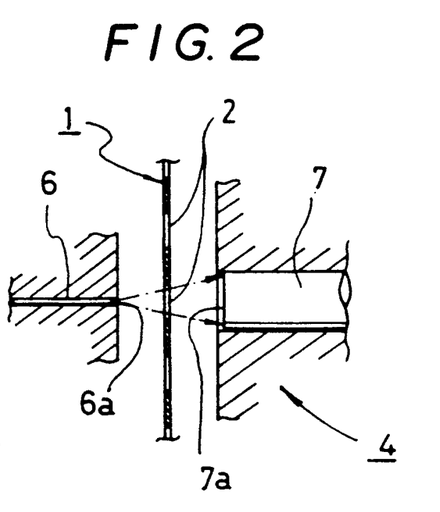
FIG. 2 is an enlarged cross sectional view thereof taken along line I—I in FIG. 1.

FIG. 1 is a perspective view illustrating one embodiment of an optical rotary encoder according to the present invention and FIG. 2 is an enlarged longitudinal cross sectional view for a portion thereof taken along line I—I in FIG. 1.

In the drawing, a disk-like rotary pulse scale 1 has a series of slits (light transmitting portions) 2, 2,—which constitute an optical coded pattern C and which are formed each at an equi-pitch along the circumferential direction thereof. A rotational shaft 3 for the pulse scale 1 is connected to a rotational shaft of an object to be measured such as a crank shaft of a car engine (not illustrated).

A photointerruptor 4 for detecting optical pulse signals in accordance with an angle of rotation comprises a housing 5 made of a synthetic resin, in which a light-emitting optical fiber 6 and a light-receiving optical fiber 7 are disposed such that light emitted from an end face 6a of the optical fiber 6 is passed through each of the slits 2, 2,—and entered one end face 7a of the light-receiving optical fiber 7 and such that both of the fibers are integrally molded and fixed in the housing 5.

The light-emitting optical fiber 6 has such a smaller diameter and a smaller numerical aperture NA that diffusion of the emitted light can be restricted without mounting a micro-lens such as a rod lens to the end face 6a thereof.

In this embodiment, an optical fiber made of quartz having a core diameter of 50 μm and a numerical number NA of about 0.2 is used and the distance between the end face 6a and the surface of the pulse scale is set to about 0.7 mm.

The light-receiving optical fiber 7 uses an optical fiber having a larger diameter and a greater numerical aperture NA than those of the light-emitting optical fiber 6, so that almost of transmission light through the slit 2 can effectively be received to the end face 7a thereof with no aid of micro-lens such as a rod lens.

In this embodiment, an optical fiber is made of heat resistant plastic fiber (for instance, at a working temperature range from −30° C. to +120° C.) and has a core diameter of 1 mm which is 20 times as large as that of the light-emitting optical fiber 6 and a numerical number NA of about 0.75, and the distance between the end face 7a and the surface of the pulse scale is set to about 0.7 mm.

The light-receiving optical fiber 7 is bent with a small radius of curvature through the inside of the housing 5 toward the opposite side of the pulse scale 1, then led out in the same direction as the wiring direction of the light-emitting optical fiber 6, and the respective optical fibers 6 and 7 are gathered into one optical fiber cable 8.

The operation of this embodiment having thus been constituted is, basically, identical with that of the conventional optical rotary encoder described previously, for example, with reference to FIG. 12, and particular advantages obtained in accordance with the present invention will be explained below.

Since the core diameter is restricted to 50 μm and the numerical aperture NA is selected to a value as low as 0.2 in the light-emitting optical fiber 6, a beam-like light with small radiation area and less divergence can be emitted form the fiber 6 without using a micro-lens such as a rod lens and, at the same time, diffusion after transmitting the slit 2 is also restricted, so that the transmission light can be received effectively to the light-receiving optical fiber 7.

Meanwhile, since the core diameter is selected to 1 mm which is greater than that of the light-emitting optical fiber 16 and the numerical aperture NA is selected as high as 0.75 in the light-receiving optical fiber 17, almost of transmission light diffused from the slit can reliably be received without mounting a light condensing rod lens thereby enabling to minimize the loss of optical transmission and allow displacement or tilting of the optical axis to some extent if any.

Accordingly, accuracy for the alignment of optical axis can be moderated and the photointerruptor 4 can be assembled easily with no accurate alignment for the optical axis.

Further, since mounting of a micro-lens such as a rod lens is no more required for both of the light-emitting and light-receiving optical fibers 6 and 7, the structure of the photointerruptor 4 can be much simplified to reduce the number of parts and, accordingly, the number of assembling steps, by which the production cost can be decreased.

Furthermore, since an easily bendable plastic fiber is used for the light-receiving optical fiber 7, it can be bent with a small radius of curvature in the housing 5 and led out in the same direction as that for the wiring direction of the light-emitting optical fiber, so that wiring operation can be applied simply.

In addition, since the plastic fiber is made of heat resistant material, it can be used with no effects of temperature such as caused by the heat of an engine, or in a cold climate district.

Further, since the light-emitting optical fiber 6 and the light-receiving optical fiber 7 are integrally molded with their optical axes being aligned in a housing 5 made of s synthetic resin, no misalignment between the optical axes is caused due to vibrations, etc.

EXAMPLE 2

Figure 3:
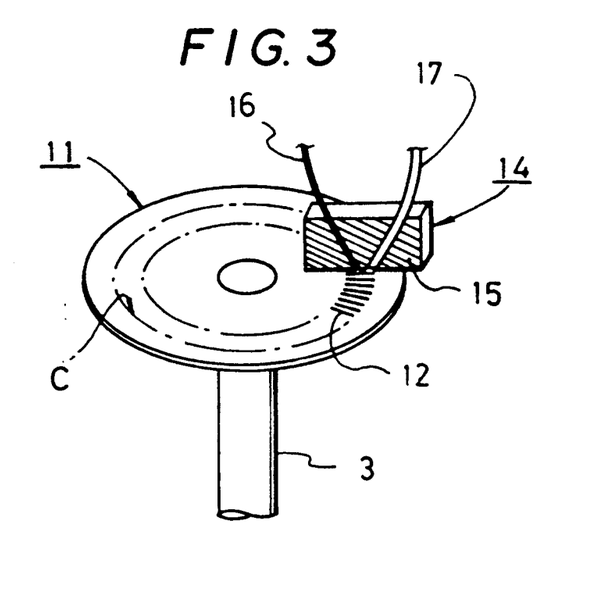
FIG. 3 is a perspective view illustrating another embodiment according to the present invention.
Figure 4:
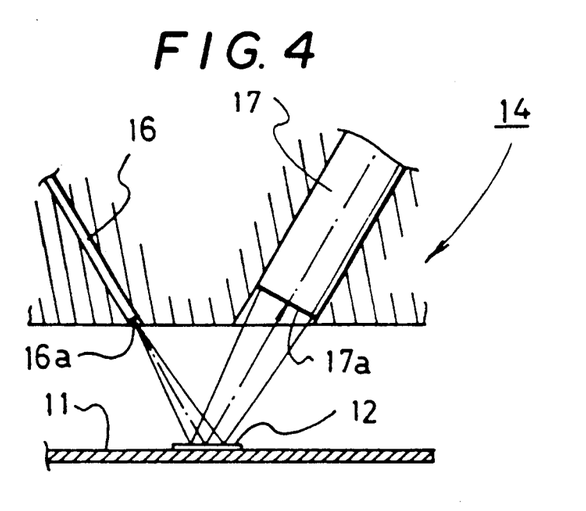
FIG. 4 is an enlarged vertical cross sectional view for a portion thereof.

FIG. 3 is a perspective view illustrating another embodiment and FIG. 4 is an enlarged vertical cross sectional view for a portion thereof.

A disk-like rotary pulse scale 1 has a series of light reflecting portions 12, 12 that constitute an optical coded pattern C each formed at an equi-pitch along the circumferential direction on the surface of the disk.

A photointerruptor 14 that outputs optical pulse signals in accordance with the angle of rotation has a light-emitting optical fiber 16 for irradiating light to the light-reflecting portion 12 and a light-receiving optical fiber 17 for receiving the reflection light from the light-reflecting portion 12, on one side of the pulse scale 1 disposed with the optical coded pattern C, with their end faces 16a and 17a being opposed to each other at an angle of 60° between each optical axis and the surface of the pulse scale 11, and integrally molded and fixed in this state in the housing 15 made of a synthetic resin.

The photointerruptor 14 is mounted being adjusted such that the intersection between the optical axes for each of the optical fibers 16 and 17 is situated at the light-reflecting portion 12 on the pulse scale 11, so that reflection light can be detected as optical pulse signals upon rotation of the pulse scale 11.

The light-emitting optical fiber 16 used has a small diameter and a small numerical aperture NA, so that diffusion of the emitted light can be reduced without mounting a rod lens to its end face 16a.

In this embodiment, a light-emitting optical fiber 16 made of quartz having a core diameter of 50 μm and a numerical number NA of about 0.2 is used and the distance between the center of the end face 16a of a fiber and the surface of the pulse scale 1 is set to about 0.7 mm.

The light-receiving optical fiber 17 uses an optical fiber having a larger diameter and a greater numerical aperture NA than those of the light-receiving optical fiber 16, so that almost of reflection light from the light reflecting portion 12 can effectively be received without mounting a micro-lens such as a rod lens to the end face 17a thereof.

In this embodiment, an optical fiber made of a heat resistant resin having a core diameter of 1 mm which is 20 times as large as that of the light-emitting optical fiber 16 and a numerical number NA of about 0.75 is used as the light-receiving optical fiber 17 and the distance between the center of the end face 17a and the surface of the pulse scale 11 is set to about 0.7 mm.

The operation of this embodiment having thus been constituted is, basically, identical with that of the conventional reflection type rotary encoder previously explained with reference to FIGS. 12, 13 and particular advantages obtained in accordance with the present invention will be explained next.

Since the core diameter is restricted to 50 μm and the numerical aperture NA is selected to a value as low as 0.2 in the light-emitting optical fiber 16, a beam-like light with small radiation area and less divergence can be emitted without mounting a micro-lens such as a rod lens and, at the same time, diffusion after reflected by the portion 12 is also restricted, so that the reflection light can be received easily by the light-receiving optical fiber 17.

Meanwhile, since the core diameter is selected to 1 mm which is greater than that of the light-emitting optical fiber 16 and the numerical aperture NA is selected as high as 0.75 in the light-receiving optical fiber 17, almost of the reflection light with diffusion from the light reflecting portion 12 can reliably be received without mounting a light condensing rod lens thereby enabling to allow the displacement or tilting to some extent of the optical axis, if any, and minimize the loss of optical transmission.

Further, if vibrations are transmitted to the pulse scale 11 and the movement is fluctuated, to deviate reflection angle during measurement, accurate angle detection can be conducted while allowing such deviation.

Further, since mounting of a micro-lens such as a rod lens is no more required for both of the light-emitting and light-receiving optical fibers 16 and 17, the structure of the photointerruptor 4 can be much simplified to reduce the number of parts and, accordingly, the number of assembling steps, thereby enabling to decrease the production cost.

Furthermore, since this is the reflection type optical rotary encoder, the light-emitting optical fiber 16 and the light-receiving optical fiber 17 can be led out in the same direction to simplify the wiring operation.

In addition, since the light-emitting optical fiber 16 and the light-receiving optical fiber 17 are integrally molded with their optical axes being aligned in the housing 14 made of a synthetic resin, no deviation is caused between the optical axes due to vibrations, etc.

EXAMPLE 3

Figure 5:
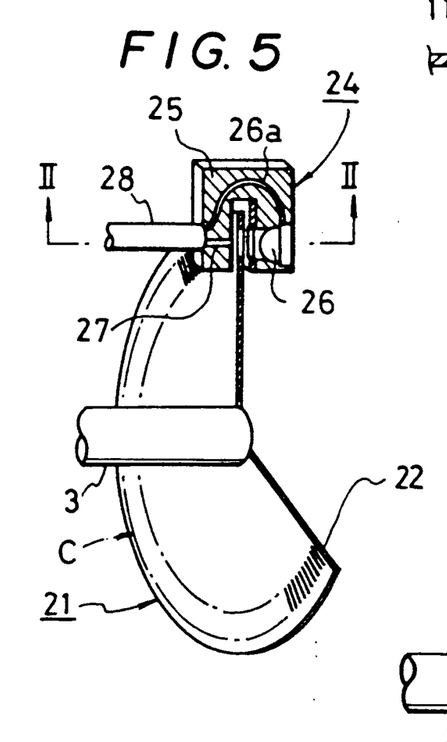
FIG. 5 is a perspective view illustrating a further embodiment according to the present invention.
Figure 6:
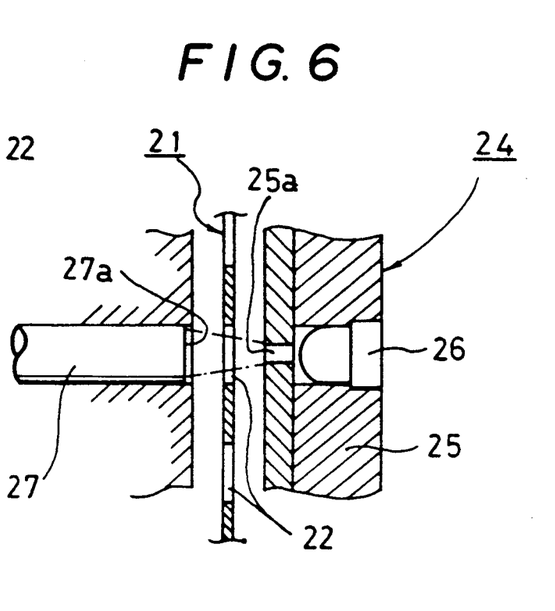
FIG. 6 is an enlarged cross sectional view thereof taken along line II—II in FIG. 5.

FIG. 5 is a perspective view illustrating a further embodiment of the present invention and FIG. 6 is a enlarged cross sectional view for a portion thereof taken along line II—II.

In a photointerruptor 24 of this embodiment, a light-emitting device 26 and an end face 27a of a light-receiving optical fiber 27 are opposed to each other on both sides of a pulse scale 21 and they are integrally molded within a housing 25 made of a resin.

The light-emitting device 26 is made, for example, of a light-emitting diode and light emitted therefrom is passed through a slit 25a formed in the housing 25 and then irradiated to the pulse scale 21.

A flexible copper wire or the like is used for a power supply wire 26a of the light-emitting device 26, bent at a small radius of curvature within the housing 25 and then led out in the same direction as the wiring direction of the light-receiving optical fiber 27 extended from the opposite side of the pulse scale 21.

The light-receiving optical fiber 27 uses a plastic fiber having, for example, 1 mm of core diameter and 0.75 of numerical aperture NA, so that light diffused from the light-emitting device 26 can surely be received, and the distance between the end face 27a of the fiber and the surface of the pulse scale 11 is set to about 0.7 mm.

The light-receiving optical fiber 27 led out from the photointerruptor 24 is gathered together with the power supply wire 26a into one composite cable 28 and then connected to a mathematical processing section (not illustrated) for calculating the angle of rotation based on the optical pulse signals.

The operation of this embodiment having thus been constituted is, basically, identical with that of the conventional rotary encoder previously explained and particular advantages obtained in accordance with the present invention will now be explained next.

In the photointerruptor 24, light emitted from the light-emitting device 26 through the slit 25a of the housing 25 is passed through the slit 22 of the pulse scale 21 and then entered, with diffusion, to the light-receiving optical fiber 27.

The light-receiving optical fiber 27 has a relatively large core diameter (for example, about 1 mm) and a great numerical aperture (for example, NA=0.75) and, accordingly, it can reliably receive most of the diffused transmission light.

Since the transmission light is diffused, the optical pulse signals can be detected so long as the end face 27a of the light-receiving optical fiber 27 is within a range overlapping the irradiation area of the transmission light in which some mismatching between the optical axes, if any, is allowed.

Further, since the light emitted from the light-emitting device 26 is received directly without by way of the optical fiber, the loss of optical transmission is extremely small.

Further, since the optical pulse signals obtained by the rotation of the pulse scale 21 are transmitted as they are in the form of optical pulse signals by way of the light-receiving optical fiber 27, they are free from undesirable effect of electromagnetic noises, for example, generated from spark plugs.

Furthermore, in a case of wiring the power supply line 26a for the light-emitting device 26 while being passed through the inside of the housing 25 and led out in the same direction as the wiring direction of the light-receiving optical fiber 27, since the power supply wire 26a can be bent freely, the size of the photointerruptor 24 can be reduced.

Accordingly, wirings cause no troubles and the rotary encoder can be installed easily even in a restricted portion such as an engine room.

Further, since the power supply wire 26a is bent within the housing 25, there is no requirement for bending the light-receiving optical fiber 27 and, accordingly, an optical fiber made of quartz can be used for the light-receiving optical fiber 27. This enables to prevent the reduction of loss of optical transmission and long time use without causing bending injury.

EXAMPLE 4

Figure 7:
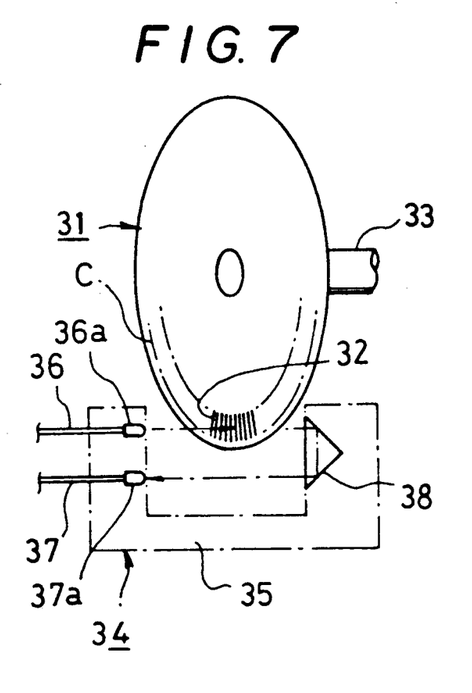
FIG. 7 is a perspective view illustrating a still further embodiment according to the present invention.

FIG. 7 is a perspective view for a still further embodiment of the present invention. In this embodiment, a photointerruptor 34 of a specific structure is used for overcoming the problem of wiring operation and preventing the failure of measurement due to vibrations.

The photointerruptor 34 comprises a light-emitting optical fiber 36 and a light-receiving optical fiber 37 disposed in on one side of a pulse scale 31, in parallel with a rotational shaft 33 and a prism (reflector 38) for reflecting light emitted from the light-emitting optical fiber 36 and entering it into the light-receiving optical fiber 37, in which the light-emitting and light-receiving optical fibers 36 and 37 and the prism 38 are integrally mounted and fixed in a housing 35.

The photointerruptor 34 is adapted such that light emitted from the light-emitting optical fiber 36 advances along an optical path passes through each of the slits 32, 32 --- formed in the pulse scale 31, then reflected twice in the prism 38 and returned and received by the light-receiving optical fiber 37 and such that the optical path is intermittently shut by the rotation of the pulse scale 31 to issue optical pulse signals in accoradance with the angle of rotation, which are detected through the light-receiving optical fiber 37.

In this embodiment, a collimate lens 36a for making the irradiation light into a parallel light is attached to the top end of the light-emitting optical fiber 36a, while a condensing lens 37a for condensing the reflection light is attached to the top end of the light-receiving optical fiber 37. However, by using a light-emitting optical fiber 36a of smaller core diameter and smaller numerical aperture NA and a light-receiving optical fiber 37 of larger core diameter and greater numerical aperture NA, the lens 36a and 37a may be omitted.

The operation of this embodiment having thus been constituted will now be explained.

In the photointerruptor 34, the light emitted from the light-emitting optical fiber 36 is transmitted through the slit 32 in the pulse scale 31 and reflected in the prism 38, and the reflection light enters the light-receiving optical fiber 37.

The optical path is intermittently shut by the rotation of the pulse scale 31 to enter the optical pulse signals in accordance with the angle of rotation to the light-receiving optical fiber 37 and the angle of rotation can be detected by applying mathematical processing to the signals.

Although the light is reflected, this embodiment is, fundamentally, based on the transmission reflection type. That is, since the light detected is not reflected on the pulse scale 31 but reflected on the prism 38 fixed in the housing 35, if the rotating pulse scale 31 causes fluctuations, the optical path suffers from no fluctuations and the optical pulse signals can be detected reliably.

In addition, since the optical path is reflected by utilizing the prism 38 and the light-emitting optical fiber 36 and the light-receiving optical fiber 37 can be led in the identical direction without bending, wiring operation is extremely easy and the size of the photointerruptor 34 can be reduced just like that in the reflection type photointerruptor.

Accordingly, wirings take no large space and can be installed easily even in a restricted space of an engine room.

Figure 8:
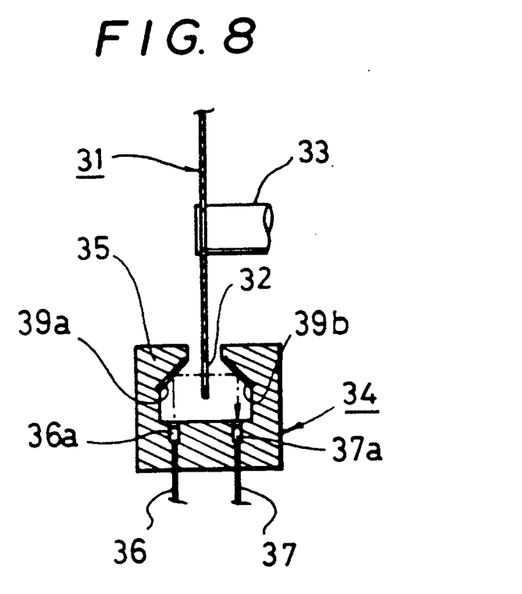
FIGS. 8 through 10 are cross sectional views, respectively, illustrating other embodiments.

FIG. 8 is a cross sectional view illustrating a yet further embodiment of the present invention.

In this embodiment, a light-emitting optical fiber 36 and a light-receiving optical fiber 37 are disposed along the extension of the diameter of the pulse scale 31.

Two reflection mirrors 39a and 39b are disposed instead of a prism on both sides of a pulse scale 31 such that the light emitted from the light-emitting optical fiber 36 is reflected by the reflection mirror 39a toward the pulse scale 31 and the transmission light through the pulse scale 31 is reflected at the reflection mirror 39b and entered into the light-receiving optical fiber 37.

Figure 9:
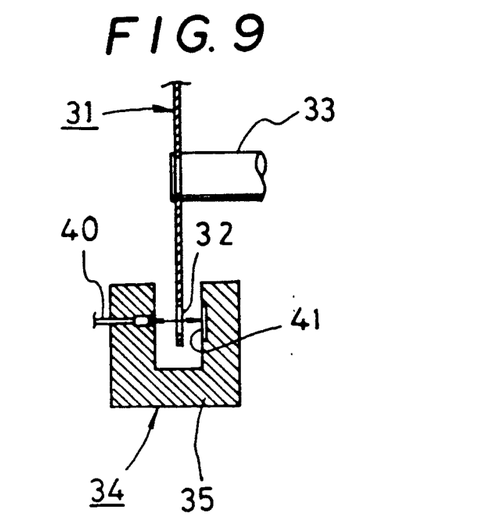
Figure 10:
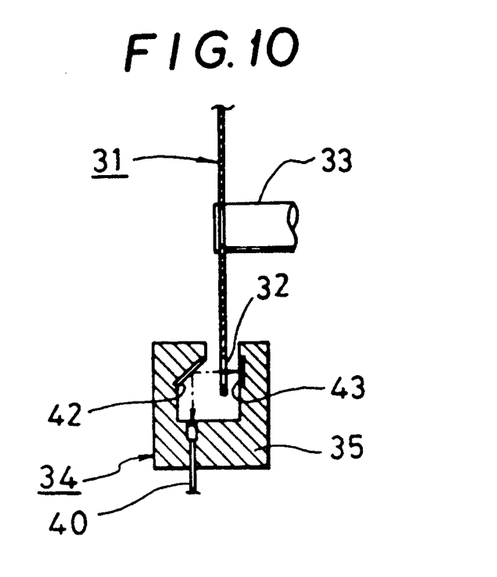

FIGS. 9 and 10 show, respectively, cross sectional views of other embodiments in which one identical optical fiber is used in common for a light-emitting optical fiber and a light-receiving optical fiber.

In the embodiment shown in FIG. 9, an optical fiber 40 and a reflection mirror 41 are opposed on both sides of a pulse scale 31, so that light emitted from the optical fiber 40 is reflected vertically at a reflection mirror 41 and then again enters the optical fiber 40.

Use of one optical fiber in common for light-emitting path and a light-receiving path can be attained by providing a simple additional means such as a half mirror.

In this embodiment, light from the optical fiber 40 is transmitted through the slit 32 upon rotation of the pulse scale 31, and reflected at the mirror 41 and enters the optical fiber 40, and optical pulse signals in accordance with the angle of rotation can be obtained.

In this embodiment, the wiring operation can be more simplified since there is no requirement for separately disposing the light-emitting optical fiber and the light-receiving optical fiber.

In the embodiment shown in FIG. 10, an optical fiber 40 is disposed along the extension of the diameter of a pulse scale 31, in which reflection mirrors 42 and 43 are disposed on both sides of a pulse scale 31, so that light emitted from the optical fiber 40 is reflected at a reflection mirror 42, irradiated to the pulse scale 31 and the transmission light therefrom is reflected at a reflection mirror 43 and then returns along the identical optical path and entered again into the optical fiber 40.

Explanations have been made with respect to specific embodiments illustrated in to the drawings, but the present invention is not restricted only to them but various modifications and improvements are possible within the gist of the present invention.

For instance, a photointerruptor comprising a pair of light-emitting and light-receiving means (one bit type) is used in each of the foregoing embodiment, but this invention may also be applied to plurality bit type photointerruptors.

Further, the pulse scale may be a cylindrical instead of disk-like shape.

Further, the optical coded pattern C formed on the pulse scale may either be an incrimental type of outputting a predetermined number of pulses in accordance with the angle of rotation, or an absolute type of directly indicating an absolute value of angle with a binary number.

Furthermore, the light-emitting optical fiber and the light-receiving optical fiber may be disposed in optional directions not limited only to the direction in parallel with or in perpendicular to the rotational shaft 3, etc.

As has been described above, the present invention can provide an excellent effect capable of obtaining optical pulse signals of a sufficient light intensity to the measurement without attaching a micro-lens such as a rod lens to the top end of an optical fiber, which can eliminate the use of the micro-lens to save troublesome alignment for the optical axes and reduce the number of parts, thus simplify the structure and reduce the production cost.

Further, since the light-emitting optical fiber and the light-receiving optical fiber can be led out in one identical direction, wiring operation for the optical fibers led out from the photointerruptor can be much simplified, as well as a space required for the wirings can be saved, which enable to disposed the photointerruptor even in a restricted space such as in an engine room.

Further, if the pulse scale causes fluctuations during rotation due to vibrations, optical pulse signals can be detected reliably and, accordingly, misoperation can be prevented.

In a modified embodiment of using one optical fiber in common with a light-emitting optical fiber and a light-receiving optical fiber, the structure is more simplified and wiring operation is extremely easy.

What is claimed is:

1. An optical encoder comprising:
   a photointerruptor having at least one pair of a light-transmitting means and a light-receiving means that constitute an optical path between both of said means,
   a rotatable pulse scale having an optical coded pattern consisting of a series of optical codes each disposed at an equi-pitch along the circumference thereof and intermittently shutting said optical path to generate and detect optical pulse signals in accordance with an angle of rotation of said rotatable pulse scale,
   said light-emitting means and said light-receiving means of said photointerruptor comprising a light-emitting optical fiber and a light-receiving optical fiber respectively, in which said light-receiving optical fiber has a larger fiber diameter and a greater numerical aperture NA than those of said light-emitting optical fiber.

2. An optical encoder as defined in claim 1, wherein the optical code comprises a light transmitting portions, formed through the rotary pulse scale,
   the light-emitting optical fiber and the light-receiving optical fiber are opposed to each other on both sides of the rotatable pulse scale such that light emitted from one end of said light-emitting optical fiber is passed through said light transmitting portion and then received by one end of said light-receiving optical fiber, and
   both of said optical fibers are integrally disposed in a housing.

3. An optical encoder as defined in claim 2, wherein at least one of the light-emitting optical fiber and the light-receiving optical fiber comprises a plastic optical fiber and said plastic optical fiber is extended within the housing while being bent in the same direction as that for another optical fiber.

4. An optical encoder as defined in claim 1, wherein the optical code comprises a series of light reflecting portions each formed on the surface of said rotatable pulse scale,
   the light-emitting optical fiber and the light-receiving optical fiber are disposed on one identical side of said rotary pulse scale disposed with the optical coded pattern such that light emitted from one end of the light-emitting optical fiber is reflected at said light reflecting portion and then received by one end of said light-receiving optical fiber, and
   both of said optical fibers are integrally disposed in a housing.

* * * * *